Sept. 2, 1930.    J. MANLY    1,774,936
AUTO TIRE LOCK
Filed April 24, 1926
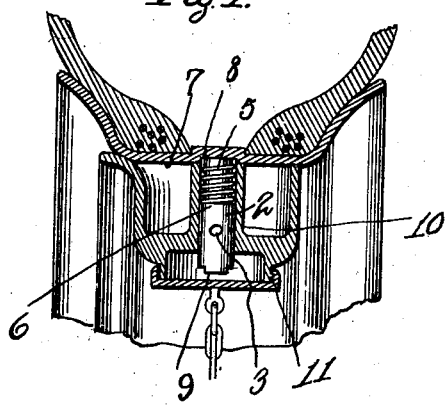
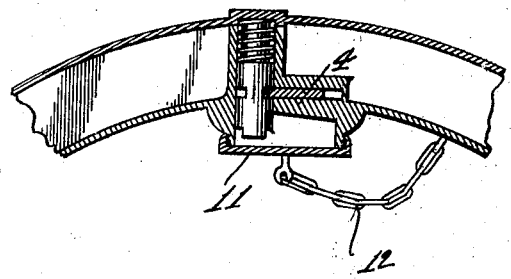
Inventor
John Manly.
By Mason Fenwick & Lawrence
Attorneys Patented Sept. 2, 1930

1,774,936

UNITED STATES PATENT OFFICE

JOHN MANLY, OF LOUISVILLE, KENTUCKY

AUTO TIRE LOCK

Application filed April 24, 1926. Serial No. 104,384.

This invention relates to a tire lock, more particularly it relates to a device adapted to lock a tire to its rim and the rim to a wheel or spare tire holder.

An object of the invention is to provide a lock means whereby the theft of a tire from its rim or of the rim from its wheel or holder is rendered difficult.

Other objects and advantages will hereinafter appear.

Embodiments of the invention are illustrated in the accompanying drawings, in which—

Figure 1 is a vertical transverse section through a tire, tire rim and lock therefor.

Figure 2 is a vertical longitudinal section of the tire, tire rim and lock shown in Figure 1.

The usual straight walled or straight edged tire is provided with a series of wires extending around the bead lengthwise of the tire. These wires prevent the tire from being stretched so as to remove the same from over the rim, thus requiring the rim to be broken before the tire can be removed therefrom. As the rim is generally broken by being contracted, it is apparent that so long as the rim is upon a wheel or upon a spare tire holder, such contraction cannot be effected, and the tire removed from the rim.

The series of wires referred to above are indicated in the drawings by the numeral 1.

The form of lock disclosed in the drawing will now be described. In the annular channel of the rim or tire holder and preferably opposite the valve stem thereof is a bolt 2. This bolt is provided with indentations 3 for the purpose of allowing a lock member 4, preferably a spring lock, to engage therein and hold the bolt when the same is pressed downwardly a sufficient distance. The bolt is reduced to its outer end and spiral spring 5 encircles the outer portion of the bolt between the tire rim and a shoulder 6 formed on the bolt. This spring tends to force the bolt 2 downwardly.

The tire rim 7 is provided with an indentation 8, adapted to receive the bolt when the bolt is in lock operative position. The rim is locked by forcing the bolt 2 upwardly against the tension of the spring 5 until the upper end of the bolt engages in the indentation 8, when simultaneously the spring lock 4 is automatically moved into engagement with indentation 3, thus holding the bolt in its raised position. In order to unlock the rim and tire from the wheel, a key of special design for each owner is inserted in the lock and turned until the lock 4 moves out of engagement with the indentation 3.

The pressure of the spiral spring 5 will then force the bolt out from the indentation 8 and allow the rim to be taken off. A lug 9 is provided on the lower end of the bolt so that the same may be removed by pliers should the spiral spring 5 lose its tension.

A close fitting housing constituted by a boss 10 protects the mechanism of the lock from water, dirt or other matter, said housing rising from the base of the channel in the rim or tire holder, to the level of the rim 7 which bridges said channel, and being closed to the ingress of foreign matter by the rim 7 when the latter is in place, and is adapted to have a screw dust cap 11 removably attached to the outer end thereof. The dust cap may be connected to the rim by a chain 12.

It should be distinctly understood that the locking member could be applied to spare tire holders as well as to the actual wheels of the automobile. Although only one specific form of the invention has been described, it should be understood that the invention is susceptible to many variations and embodiments within the scope of the appended claim.

What I claim is:

In combination with a tire holder comprising a channeled annulus, and a rim seated upon said annulus in bridging relation to said channel, a cylindrical hollow boss rising from the base of said channel to the level of said rim, the latter forming a closure for the outer end of said boss, a bolt having an inner part slidably fitting in said boss, and a reduced outer part operatively engaging said rim to lock the same, said reduced part defining with the surrounding wall of said boss and said rim, an enclosed chamber, an actuating spring housed within said chamber, said bolt being formed with means adapted to interengage with the locking element of a lock.

In testimony whereof I affix my signature.

JOHN MANLY.